US012760573B2

(12) United States Patent
Mackay et al.

(10) Patent No.: US 12,760,573 B2
(45) Date of Patent: Oct. 13, 2026

(54) MOUNTING ASSEMBLY FOR A SLIDING DOOR

(71) Applicant: EXELOO LIMITED, Hamilton (NZ)

(72) Inventors: Eric Charles Mackay, Hamilton (NZ); Jonathon James Gee, Hamilton (NZ); Lorne Richard Mackay, Hamilton (NZ)

(73) Assignee: EXELOO LIMITED, Hamilton (NZ)

( * ) Notice: Subject to any disclaimer, the term of this patent is extended or adjusted under 35 U.S.C. 154(b) by 0 days.

(21) Appl. No.: 18/846,506

(22) PCT Filed: Mar. 17, 2023

(86) PCT No.: PCT/NZ2023/050033

§ 371 (c)(1), (2) Date: Sep. 12, 2024

(87) PCT Pub. No.: WO2023/177309

PCT Pub. Date: Sep. 21, 2023

(65) Prior Publication Data

US 2025/0188778 A1 Jun. 12, 2025

(30) Foreign Application Priority Data

Mar. 17, 2022 (AU) ................................ 2022259850

(51) Int. Cl.
*E05D 15/06* (2006.01)

(52) U.S. Cl.
CPC ..... *E05D 15/0639* (2013.01); *E05D 15/0634* (2013.01); *E05Y 2600/14* (2013.01); *E05Y 2900/132* (2013.01)

(58) Field of Classification Search
CPC ............ E05D 15/0639; E05D 15/0634; E05D 15/063; E05Y 2900/132; E05Y 2201/64
(Continued)

(56) References Cited

U.S. PATENT DOCUMENTS 2,957,197 A * 10/1960 Johnson, Jr. .......... E05D 15/063 16/105
3,193,870 A * 7/1965 Mcninch ............... E05D 15/063 16/105

(Continued)

FOREIGN PATENT DOCUMENTS

CN 114059879 A 2/2022
EP 0940543 A2 9/1999

(Continued)

OTHER PUBLICATIONS

International Search Report and Written Opinion received for PCT/NZ2023/050033, dated May 31, 2023.

*Primary Examiner* — Justin B Rephann
(74) *Attorney, Agent, or Firm* — Greer, Burns & Crain, Ltd

(57) ABSTRACT

An assembly for mounting a door to a rail to move between open and closed positions, the assembly including a carriage, a mounting plate configured to be mounted to the top of the door, a pin extending between the carriage and the mounting plate, a connection member attached to or formed with the pin to connect the pin to the mounting plate, the connection member comprising a head and a neck, wherein the mounting plate has a slot, the slot including a lower portion and an upper portion, the upper portion dimensioned to receive the neck and the lower portion dimensioned to receive the head, and wherein the head is too wide to be received in or pass through the upper portion so that in use the door hangs from the mounting assembly with the mounting plate bearing on the head of the connection member.

13 Claims, 8 Drawing Sheets

(58) Field of Classification Search
USPC .................................................... 49/409, 425
See application file for complete search history.

(56) References Cited

U.S. PATENT DOCUMENTS

| | | | | | |
|---|---|---|---|---|---|
| 3,193,871 | A * | 7/1965 | Foltz | E05D 15/063 | 210/98 |
| 3,287,759 | A * | 11/1966 | Foltz | E05D 15/26 | 160/199 |
| 3,479,682 | A * | 11/1969 | Mcninch | E05D 15/26 | 16/97 |
| 3,757,384 | A * | 9/1973 | Rusch | E05D 15/063 | 16/97 |
| 3,813,728 | A * | 6/1974 | Johnson | E05D 15/26 | 16/105 |
| 3,829,929 | A * | 8/1974 | Foltz | E05D 15/063 | 292/DIG. 20 |
| 6,209,171 | B1 * | 4/2001 | Pelletier | E05D 15/08 | 403/374.5 |
| 8,046,872 | B2 * | 11/2011 | Burgess, III | E05D 15/0639 | 16/104 |
| 8,984,716 | B2 * | 3/2015 | Proctor | E05D 15/063 | 16/97 |
| 10,557,297 | B2 * | 2/2020 | Stenhouse | E05D 15/26 | |
| 10,604,930 | B2 * | 3/2020 | Downey | E04B 2/827 | |
| 2009/0289463 | A1 * | 11/2009 | Tsai | E05D 15/0639 | 292/341.15 |
| 2010/0037427 | A1 * | 2/2010 | Burgess, III | E05D 15/0639 | 16/97 |
| 2013/0160240 | A1 * | 6/2013 | Kenny | E05F 1/16 | 16/89 |

FOREIGN PATENT DOCUMENTS

| | | | |
|---|---|---|---|
| IT | UB20154675 | A1 | 4/2017 |
| JP | S5827469 | U | 2/1983 |
| JP | H0612680 | U | 2/1994 |
| KR | 20-2010-0007073 | U | 7/2010 |

* cited by examiner

MOUNTING ASSEMBLY FOR A SLIDING DOOR

BACKGROUND

The invention relates to an assembly for mounting a door to a rail to allow the door to move along the rail between open and closed positions.

Mounting a door to move along a rail between open and closed positions is well known. This configuration of door is typically referred to as a 'sliding door'. A sliding door is typically mounting to the rail via a carriage assembly, typically with one or more wheels to roll (i.e. slide) along the rail.

Various carriage or mounting arrangements have been employed over the years to mount a door to slide along a rail. However, there are often problems associated with installation of a door to carriage assembly on a rail. Connection of the mounting or carriage assembly to the door can be difficult and can often require two people to lift and locate the door to the carriage assembly.

Many existing sliding door mounting arrangements can also be cumbersome to install, and require channels to be routed in the top edge of the door to receive the mounting hardware. This routing generally requires a skilled labourer to do properly, and as a result these mounting systems are not suitable as an off-the-shelf DIY kit of parts.

It is also highly desirable to improve the reliability of sliding door mounting arrangements. Sliding door mounting assemblies can fail for a number of reasons. Mounting arrangements can result in the height of the door slowing dropping over time, requiring periodic adjustments to be made. Maintenance and/or disassembly for maintenance or replacement of carriages can be difficult, again requiring two or more people to remove a door from a rail. Some arrangements may include a latch mechanism to attach the door to the carriage, which introduces complexities to the door mount assembly and to the installation and removal of a door. Furthermore, latch assemblies can become jammed, for example due to debris or dirt over time, preventing disassembly such that destruction (i.e. cutting) of the mounting arrangement is required to remove the door from the rail.

In some door mounting systems, small generally plastic tabs or clips are used to secure components of the door mounting system to prevent movement. However, these have been found to fail over time, dislodge, fall out, or otherwise become lost which can compromise the performance of the door mounting system. In some situations, these clips can become lodged in the track further hindering the movement of the door.

It is an object of the invention to provide an assembly to mount a door to move along a rail that addresses one or more of the above or below-mentioned disadvantages, or provides other advantages as mentioned herein, or that at least provides the public or industry with a useful choice.

SUMMARY

According to one aspect of the technology, there is provided an assembly for mounting a door to a rail to move between open and closed positions, the assembly comprising:

- a carriage,
- a mounting plate configured to be mounted to the top of the door,
- a securing plate configured to attach to the mounting plate,

- a pin extending between the carriage and the mounting plate,
- a connection member threadably attached to the pin to adjustably connect the pin to the mounting plate, the connection member comprising a head, a neck and a nut portion,
- wherein the mounting plate includes an open ended slot, the slot comprising a lower portion and an upper portion, the upper portion dimensioned to receive the neck and the lower portion dimensioned to receive the head, and wherein the head is too wide to be received in or pass through the upper portion so that in use the door hangs from the mounting assembly with the mounting plate bearing on the head of the connection member, and
- further wherein the securing plate comprises an open ended slot and wherein, when the securing plate is attached to the mounting plate, the slot in the securing plate is aligned with the slot in the mounting plate so as to form a closed slot which receives the connection member, and wherein one or more sidewalls of the slot in the securing plate are configured to engage with the nut portion to prevent rotation of the connection member in use.

The configuration of the slot provides for an easy and simple connection of the door to the mounting assembly. The assembly may include a number of further features to simplify the installation process of hanging the door by the mounting assembly.

In some embodiments, the height of the head is commensurate with a height of the lower portion of the slot.

The slot may be open through an end of the mounting plate to allow the connection member to be inserted into the slot from an end of the mounting plate.

In some embodiments, the mounting plate comprises a pair of tabs at an end of the mounting plate, the tabs spaced apart to present an entry or alignment slot aligned with the lower portion of the slot.

The entry slot may have the same width as the lower portion of the slot.

The height of the tabs may be the same as the height of the lower portion of the slot.

The mounting assembly comprises a securing plate mounted to the mounting plate to capture the connection member within the slot. The securing plate closes an open end of the slot to capture the connection member within the slot.

The securing plate prevents movement of the connection member along the slot. The connection member is captured in a horizontal direction between the securing plate and a closed end of the slot.

The assembly may comprise a locking member to lock the securing plate to the mounting plate.

For example, the mounting plate has an aperture and the securing plate has a corresponding aperture, and with the securing plate positioned on the mounting plate, the apertures are aligned to receive the locking member.

The locking member may be a pin or rod configured to be dropped into the aligned apertures, such that no tools are required to connect the connection member to the mounting plate.

The mounting plate may comprise a recess or projection and the securing plate a corresponding projection or recess, such that engagement of said recess and projection couples the securing plate to the mounting plate in a vertical direction. The securing plate is attached to the mounting plate by sliding the securing plate on the mounting plate in a direction along the slot.

In some embodiments, the securing plate comprises a feature to engage a complementary feature on the connection member to prevent the connection member from rotation relative to the securing plate and therefore the mounting plate. In some embodiments, the securing plate presents a lateral surface to engage a flat surface on the connection member to prevent rotation of the connection member relative to the securing plate. The connection member may comprise at least a pair of diametrically opposed flat surfaces for engagement by a spanner and the lateral surface of the securing plate engages one or more said flat surfaces. The securing plate may have a recess or slot to receive the connection member. Lateral sides of the securing plate recess or slot engages one or more said flat surfaces on the connection member to prevent rotation of the connection member relative to the securing plate.

In an aspect of the invention, the connection member is attached to the pin by a threaded engagement to provide for height adjustment of the door.

In some embodiments, the carriage comprises a chassis and the assembly comprises a joint between the chassis and the pin to allow the pin to pivot relative to the chassis. The joint may allow for the pin to pivot or rotate relative to the chassis. In some embodiments, the joint allows for the pin to pivot or rotate relative to the chassis about a pivot axis perpendicular to a longitudinal axis of the pin and parallel to the rail. The chassis may comprise a socket, and the pin comprises a ball at an upper end received in the socket to form the joint. A pair of diametrically opposed members may be provided between the ball and chassis on a central axis of the ball perpendicular to a longitudinal axis of the pin.

To move along the rails, the carriage may comprise a chassis and one or wheels rotationally mounted to the chassis.

The mounting assembly of the first aspect may be configured for a sliding door assembly, for example a cavity sliding door assembly. In another aspect, the invention may provide a cavity sliding door assembly comprising a door, a frame presenting a cavity for receiving the door when in an open position, a rail, and an assembly for mounting the door to the rail as described in any one or more of the above statements in relation to the first aspect of the invention.

According to a further aspect of the invention, there is provided an assembly for mounting a door to a rail to move between open and closed positions, the assembly comprising:

- a carriage,
- a mounting plate configured to be mounted to the top of the door,
- a pin extending between the carriage and the mounting plate,
- a connection member attached to the pin to connect the pin to the mounting plate, wherein the connection member is attached to the pin by a threaded engagement to provide for height adjustment of the door.

In an aspect of the invention, the connection member comprises a head and a neck, and the mounting plate has a slot dimensioned to receive the neck, wherein the head is too wide to be received in or pass through the slot so that in use the door hangs from the mounting assembly with the mounting plate bearing on the head of the connection member.

In some embodiments, the mounting assembly comprises a securing plate mounted to the mounting plate to capture the connection member within the slot. The securing plate may comprise a feature to engage a complementary feature on the connection member to prevent the connection member from rotation relative to the securing plate and therefore the mounting plate. For example, the securing plate presents a lateral surface to engage a flat surface on the connection member to prevent rotation of the connection member relative to the securing plate. The connection member may comprise at least a pair of diametrically opposed flat surfaces for engagement by a spanner and the lateral surface of the securing plate engages one or more said flat surfaces. The securing plate may have a recess or slot to receive the connection member, lateral sides of the securing plate recess or slot engaging one or more said flat surfaces on the connection member to prevent rotation of the connection member relative to the securing plate.

The second aspect may comprise any one or more features described above in relation to the first aspect of the invention.

According to a further aspect of the invention, there is provided a method for mounting a door to a rail to move between open and closed positions, the method comprising:

- providing a mounting assembly as described in any one more of the above statements summarising the invention,
- attaching the mounting plate to the top of the door and engaging the carriage with the rail to move along the rail,
- lifting the door to engage the connection member with the mounting plate to receive the head in the lower portion of the slot and neck in the upper portion of the slot to hang the door from the mounting assembly on the rail with the mounting plate bearing on the head of the connection member.

In some embodiments, engaging the connection member with the mounting plate comprises vertically aligning the head with the lower portion of the slot and moving the connection member along the slot. The slot may be open through an end of the mounting plate and the method comprises inserting the connection member into the slot from the open end of the slot. The mounting plate may comprise an entry slot aligned with the lower portion of the slot and the method comprises inserting the head into the entry slot and moving the head along the entry slot to move the head into the lower portion of the slot and the neck into the upper portion of the slot. The height of the head may be commensurate with the height of the lower portion the slot, and the method comprises lifting the door to contact the head with a top edge of the door, and moving the connection member along the top edge surface of the door until the head and neck are received in the lower and upper portions of the slot.

The mounting assembly may comprise a securing plate and the method comprises attaching the securing plate to the mounting plate to capture the connection member within the slot, for example by sliding the securing plate onto the mounting plate in a direction along the slot. The mounting assembly may comprise a locking member and the mounting plate and securing plate with complementary apertures that are aligned when the securing plate is attached to the mounting plate. The locking member may be dropped into the aligned apertures to lock the securing plate to the mounting plate in a vertical direction.

In an aspect of the invention, the connection member is attached to the pin by a threaded engagement and the method comprises adjusting a height of the door relative to the rail by rotating the connection member on the pin. The securing plate may have a feature to engage a complementary feature on the connection member to prevent the connection member from rotation relative to the securing plate, and the method comprises rotating the connection member for height adjustment of the door and attaching the securing plate to the mounting plate to capture the connection member and prevent rotation of the connection member to set the height of the door.

In a further aspect of the invention, there is provided a two-part mounting and securing plate assembly, for hanging a door carriage assembly which includes a connection member, the two-part mounting comprising:

- a mounting plate which includes an open ended first slot, and an open ended second slot, configured to in-use receive the door carriage assembly;
- a securing plate, which includes an open ended securing slot which is configured to in-use:
  - connect to the top of a slider door; and
  - overlay, at least partially, with the mounting plate so the open ended second slot, and the open ended securing slot align to create a closed ended slot or aperture; wherein the securing slot has sides and a terminal end thereof which are adapted to in-use engage with and prevent rotation of a connection member.

In a further aspect there is provided a securing plate, which includes an open-ended securing slot which is configured to, in-use:

- connect to the top of a slider door; and
- overlay, at least partially, with the mounting plate so the open ended second slot, and the open-ended securing slot align to create a closed ended slot or aperture; wherein the securing slot has sides and/or a terminal end thereof which are adapted to in-use engage with and prevent rotation of a connection member.

Preferably the connection member includes a nut portion.

In a still further aspect, there is provided a securing plate which includes sides and/or a terminal end which engage and hold a nut portion on a connection member therein.

In yet a still further aspect there is provided a use of securing plate substantially as described above to rotate the nut portion forming part of a connection member to adjust the height at which a carriage assembly supports a sliding door.

In examples, the open ended first slot and/or the open ended second slot on the mounting plate may be positioned substantially centrally on the mounting plate.

In examples, the securing slot may be positioned substantially centrally on the securing plate.

In examples, the connection member may comprise a threaded aperture, which engages with a threaded carriage pin.

In a further aspect the present invention there is provided a connection member which includes:

- a nut portion;
- a head;
- a neck which joins the nut and head;

wherein a threaded aperture passes through the nut, head and neck; and wherein the lateral dimensions of the head are greater than those of the nut portion which are greater than those of the neck.

Preferably, in-use the lateral dimensions of the head are greater than those of an upper slot in the mounting plate.

Preferably, the nut portion resembles a hex nut although a four sided nut portion could also be used.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

The entire disclosures of all applications, patents and publications cited above and below, if any, are herein incorporated by reference.

Reference to any prior art in this specification is not, and should not be taken as, an acknowledgement or any form of suggestion that that prior art forms part of the common general knowledge in the field of endeavour in any country in the world.

The invention may also be said broadly to consist in the parts, elements and features referred to or indicated in the specification of the application, individually or collectively, in any or all combinations of two or more of said parts, elements or features.

Further aspects of the invention, which should be considered in all its novel aspects, will become apparent to those skilled in the art upon reading of the following description which provides at least one example of a practical application of the invention.

BRIEF DESCRIPTION OF THE DRAWINGS

One or more embodiments of the invention will be described below by way of example only, and without intending to be limiting, with reference to the following drawings, in which:

FIG. 5A is a top view, 5B is an end view, 5C is a side view, and 5D is a bottom view.

FIG. 6A is a top view, 5B is an end view, 5C is a side view, and 5D is a bottom view.

DETAILED DESCRIPTION

Figure 1:
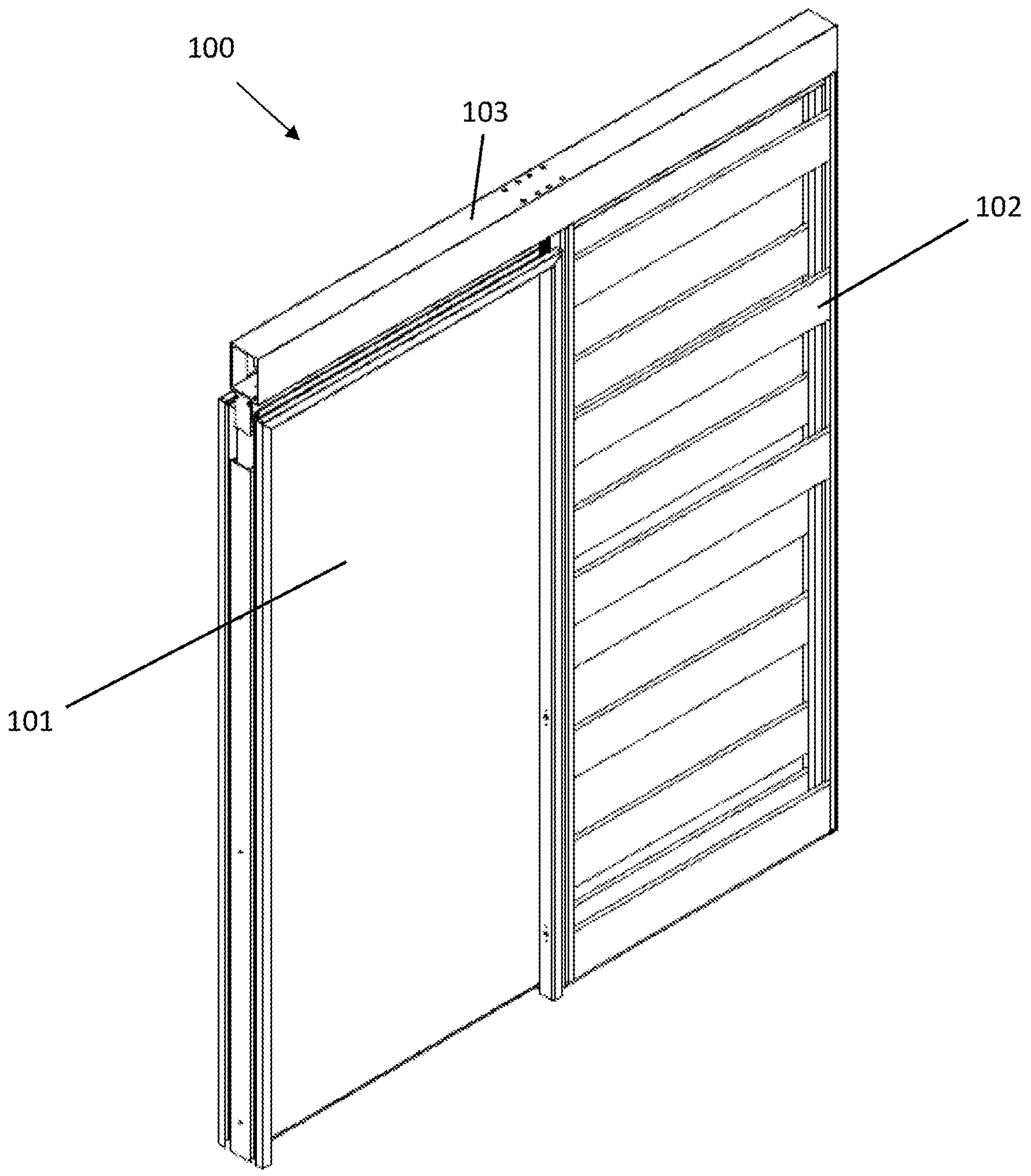
FIG. 1 illustrates a cavity sliding door assembly.

A cavity sliding door assembly 100 is shown in FIG. 1. The sliding door assembly 100 comprises a door 101, a frame 102 presenting a cavity for receiving the door when in an open position, a rail 103, and a mounting assembly (not shown in FIG. 1) for mounting the door 101 to move or travel along (herein slide) on the rail 103 between open and closed positions.

Figure 2A:
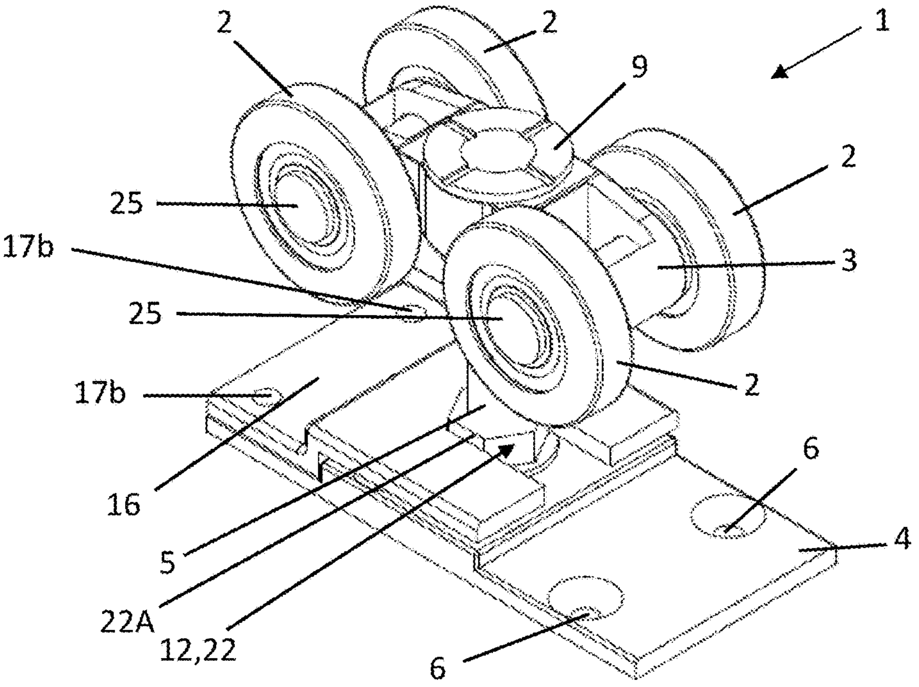
FIGS. 2A and 2B illustrate a door mounting assembly according to an embodiment of the present invention.
Figure 2B:
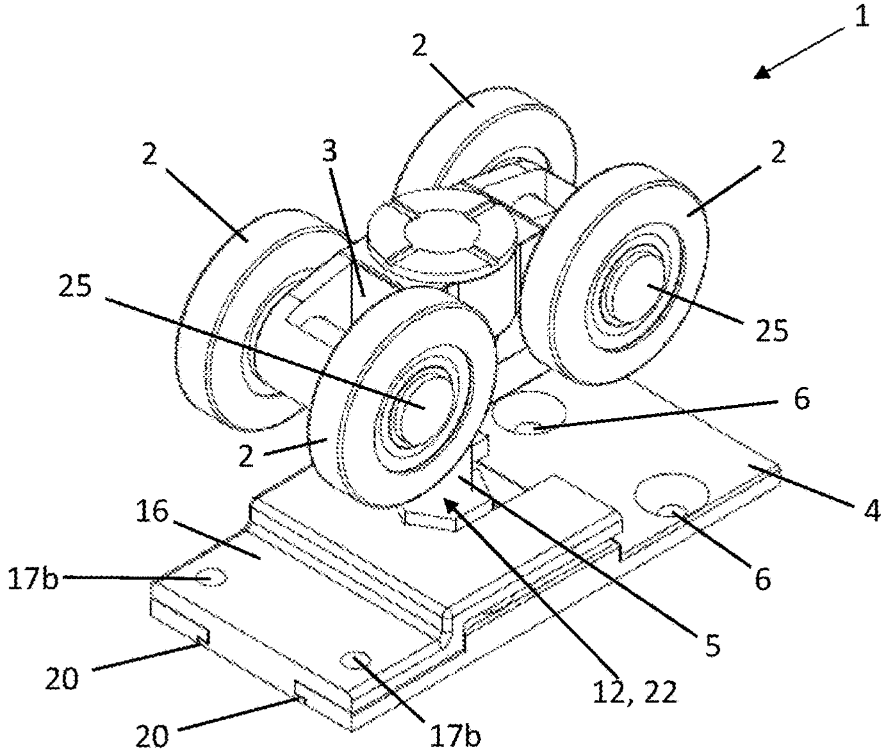
Figure 3:
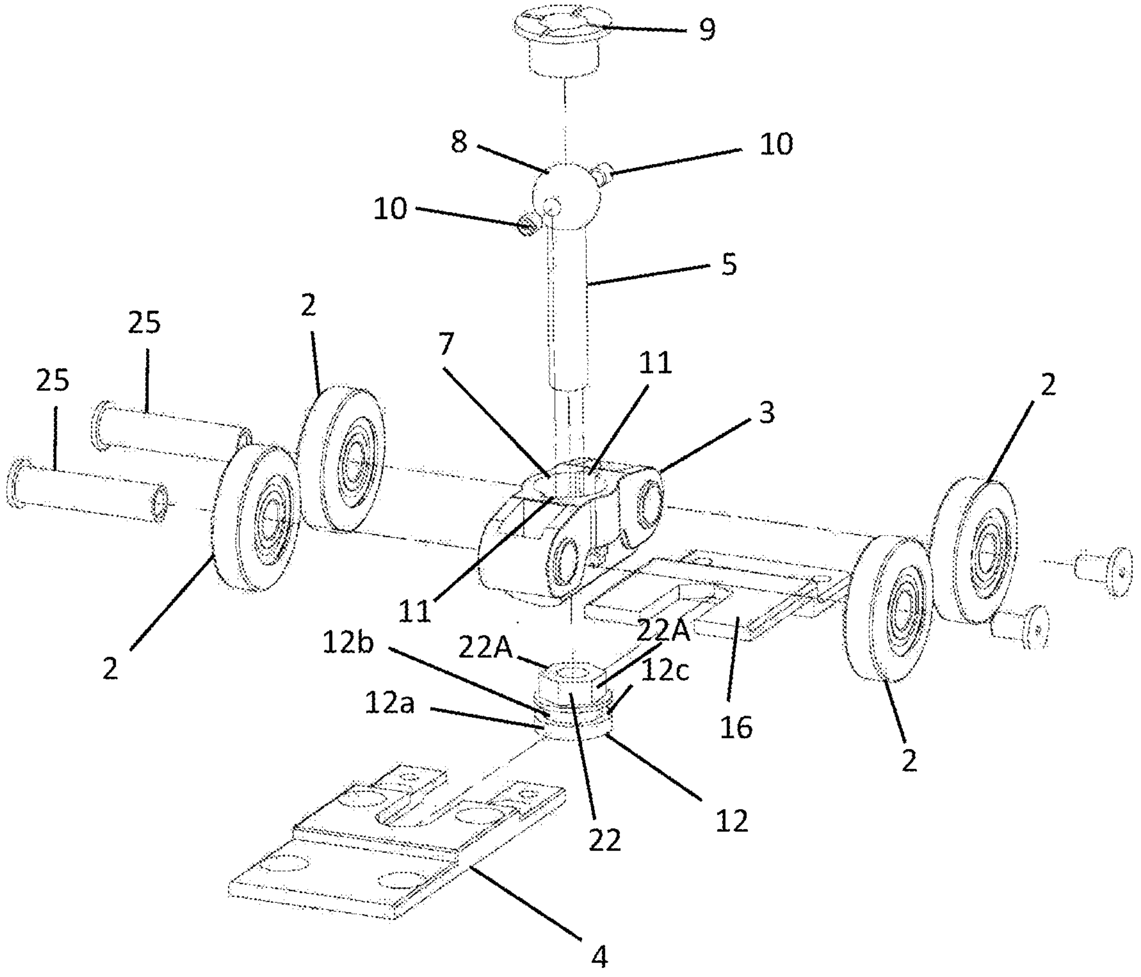
FIG. 3 provides an exploded view of the assembly of FIGS. 2A and 2B.
Figure 9:
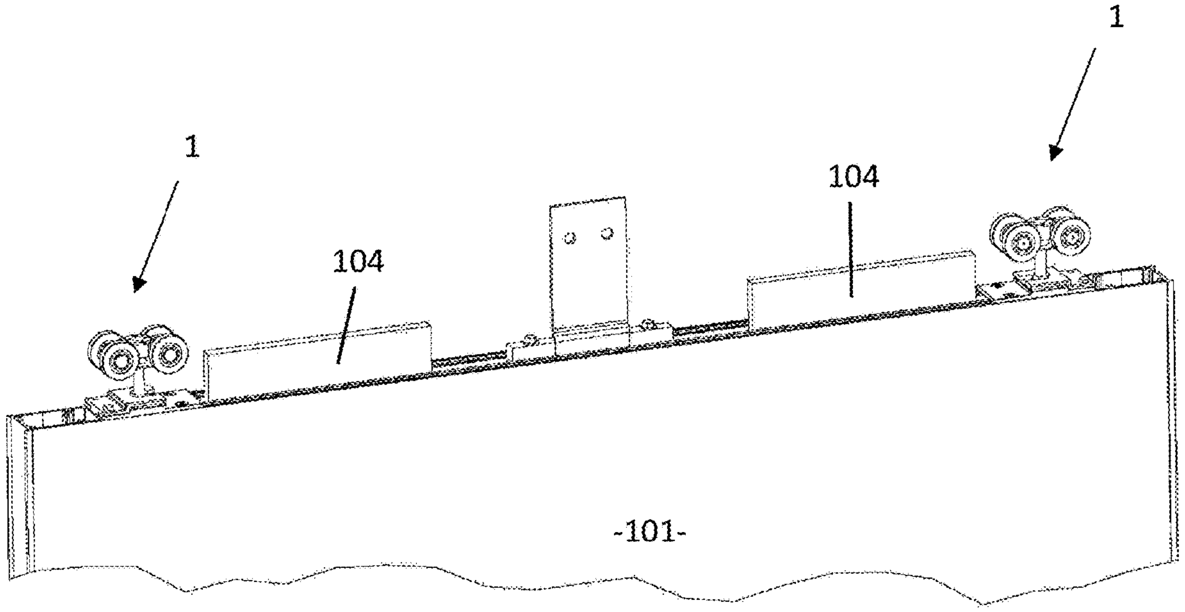
FIG. 9 illustrates a top portion of a door of the cavity sliding door assembly of FIG. 1, with two mounting assemblies as shown in FIGS. 2A and 2B attached to the top of the door.

A mounting assembly 1 for mounting the door 101 to the rail 103 according to an embodiment of the present invention is shown in FIGS. 2A and 2B. An exploded view of the assembly 1 is shown in FIG. 3. The assembly 1 is configured to be attached to a top edge of the door and hang from the rail 103 to allow the door 101 to slide along the rail 103 between open and closed positions. Typically, two mounting assemblies 1 are attached to the top of the door, spaced apart along the top edge of the door (refer FIG. 9), to hang the door from the rail located above the door.

The mounting assembly 1 comprises a carriage to carry the door along the rail. The carriage has wheels 2. The wheels 2 engage the rail 103 to roll (slide) along the rail 103. The carriage has a chassis 3 to which the wheels are rotationally mounted. The illustrated embodiment has two pairs of wheels. The wheels are mounted on axles 25 extending through the chassis 3. Other carriage configurations are possible, for example there may be one or more wheels and alternative wheel mounting arrangements, and/or the carriage may comprise alternative sliding elements.

The assembly 1 comprises a mounting plate 4 configured to be attached to the top edge of the door. A carriage pin 5 extends between the carriage chassis 3 and the mounting plate 4, to connect the door 101 to the carriage 3 to slide on the rail 103. The mounting plate 4 has apertures 6 to receive fasteners (not shown) therethrough to attach the plate 4 to the top of the door.

Figure 7A:
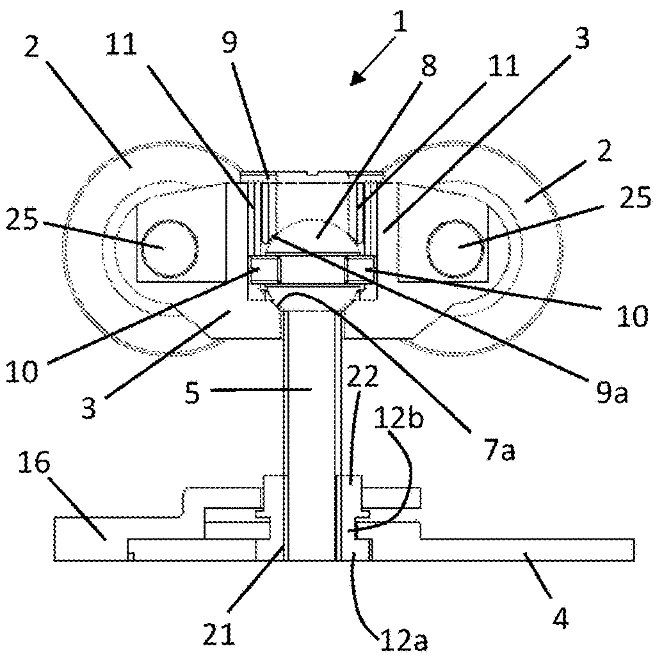
FIG. 7A is a cross sectional view of the mounting assembly of FIGS. 2A and 2B on a section plane on a central axis of a carriage pin of the assembly.
Figure 7B:
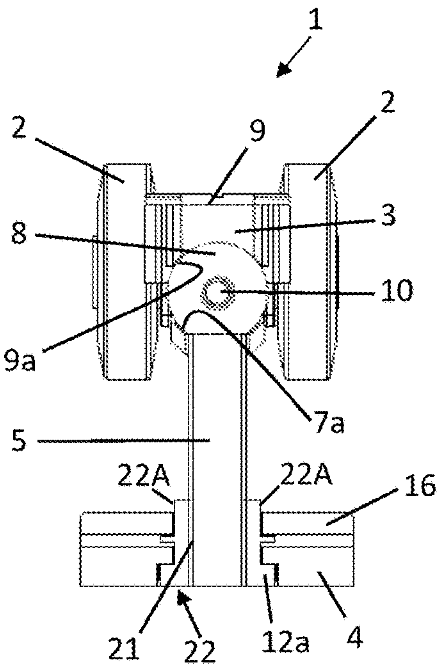
FIG. 7B is a cross sectional view of the mounting assembly of FIGS. 2A and 2B on a section plane on a central axis of the carriage pin perpendicular to the section in FIG. 7A.

An upper end of the pin 5 is received in a socket 7 within the chassis. The pin 5 comprises a ball 8 at the upper end, to be received in the socket 7. As best shown in FIGS. 7A and 7B, the socket 7 provides a seat 7*a* on which the ball 8 is received. The ball 8 and socket 7 together form a ball and socket joint to allow for pivoting or rotational movement between the pin 5 and carriage chassis 3, and therefore between the door 101 and the rail 103. A cap 9 is mounted to the chassis 3 (e.g. by a threaded engagement) to capture the ball 8 within the socket 7. The cap 9 also provides a seat 9*a* opposite to the carriage seat 7*a* to capture the ball therebetween.

The use of a ball-and-socket mounting arrangement may advantageously allow for multi-axial rotation of the door relative to the cavity and carriage to which is it mounted, for example the ball-and-socket arrangement may allow for longitudinal tilting of the door, i.e. in the axis of movement of the door, together with lateral movement of the door, i.e. perpendicular to the axis of movement of the door. This arrangement may advantageously allow for self-centering of the door within the cavity, (for example by way of free lateral movement) as well as allowing for each end of the door to be mounted to the carriage separately. For example, a first end of a door, may be lifted and the door mounting hardware attached, while the opposing end of the door remains at rest on the ground. Accordingly, the engaged end of the door may be higher, than the opposing end of the door, which is at rest on the ground. Once attached, the second end of the door may be raised and connected to the mounting hardware thereby levelling out the door within the cavity. This can advantageously reduce the total weight that an installer may need to lift, reduce the number of people required to mount the door, may the mounting system better suited for frail people, or those with disabilities and/or reduce the likelihood of heath and safety incidents occurring during installation, such as the door falling onto the user's toes and feet.

A pair of diametrically opposed members (grub screws) 10 are provided to the ball 8 on a central axis of the ball perpendicular to a longitudinal axis of the pin 5. The members 10 are received in complementary recesses or grooves 11 provided to the chassis 3 adjacent the socket 7 to restrict movement of the pin 5 relative to the chassis 3 to pivot or rotate about a pivot axis perpendicular to the longitudinal axis of the pin 5, i.e. about a horizontal axis. The pivot axis is parallel to a longitudinal axis of the rail 103 and/or is in a plane of the door 101 in use. Other joint arrangements may be provided to connect the pin 5 to the chassis 3 while allowing for the door 101 to pivot relative to the rail 103 about an axis parallel to a longitudinal axis of the rail.

The assembly further comprises a connection member 12 attached to or formed with the pin 5. The connection member 12 connects the pin 5 to the mounting plate 4 to thereby couple the door 101 to the carriage.

The mounting plate 4 is best illustrated in FIGS. 4A and 5A to 5D. The mounting plate 4 has an open ended slot 13 configured to receive the connection member 12 to connect the pin 5 to the mounting plate 4. This slot 13 may be referred to herein as a second open ended slot, which together with the first open ended slot 15, provide a channel to receive the connection member 12 in use. The slot 13 has lower portion 13*a* and an upper portion 13*b*. The upper portion 13*b* is narrower than the lower portion 13*a*. As shown in FIG. 3, the connection member 12 has a head 12*a* to be received in the wider lower portion 13*a*, and a neck 12*b* to be received in the narrow upper portion 13*b*. The upper portion 13*b* of the slot is dimensioned to receive the neck 12*b*, and the lower portion 13*a* is dimensioned to receive the head 12*a*. The head 12*a* is too wide to be received in or pass through the narrow upper portion 13*b* of the slot 13, such that the door hangs from the mounting assembly 1 with the mounting plate 4 bearing on the head 12*a* of the connection member 12. The head presents a shoulder 12*c* (FIG. 3) to bear on a corresponding shoulder 13*c* (FIG. 5B) on the mounting plate.

To insert the connection member 12 into the slot 13, the head 12*a* is vertically aligned with the wider lower portion 13*a* of the slot 13. The connection member 12 is moved along the open ended slot 13 to receive the head 12*a* of the connection member 12 in the lower portion 13*a* of the slot and the neck 12*b* of the connection member 12 in the narrow upper portion 13*b* of the slot, to couple the pin 5 to the mounting plate 4, as shown in FIGS. 7A and 7B.

In the illustrated embedment, the slot 13 is open ended, i.e. the opening is provided through an end of the mounting plate 4, to allow the connection member 12 to be inserted into the slot 13 from an end of the mounting plate 4, for example from an open end of the slot.

In the illustrated embodiment, the mounting plate comprises a set of low-profile opposing arms which are directly mounted to the top of the door in use using fasteners inserted through apertures 6. This configuration can reduce the overall height profile of the mounting system allowing for a smaller gap between the top of the door and the carriage, and therefore a more compact, and less visible mounting system. Furthermore, by directly mounting the arms to the top of the door via fasteners in the apertures 6 means the loading weight of the door may be directly transferred through the fasteners, reducing the stresses imparted to the mounting plate 4 which may result in deformation of the mounting plate over time.

In the illustrated embodiment, the mounting plate 4 has a pair of tabs 14 at an end of the mounting plate 4. The tabs 14 are spaced apart to present an entry or alignment slot 15 also referred to herein as a first open ended slot. The first open ended slot 15 is aligned with the lower portion 13*a* of the slot 13. The entry slot has the same width as the lower portion 13*a* of the slot 13. In the illustrated embodiment, the height of the tabs 14 is the same as the height of the lower portion 13*a* of the slot 13. To insert the neck 12*b* of the connection member 12 into the upper portion 13*b* of the slot 13, the head 12*a* is initially placed in the entry slot 15 (with the neck 12*b* above the tabs 14). The connection member 12 can then be moved along the entry slot 15 to then move the head 12*a* into the lower portion 13*a* of the slot and the neck 12*b* into the upper portion 13*b* of the slot, to connect the mounting place 4 to the carriage. Thus, the entry slot 15 forms a guide, to align the connection member 12 in a horizontal direction with the slot 13 so that the neck 12*b* and head 12*a* are easily received into the 13 slot (the connection slot) of the mounting plate 4.

In the illustrated embodiment, the height of the head 12*a* is commensurate with (matched to) the height of the lower portion 13*a* of the connection slot 13, so that the head 12 is configured to engage a surface immediately below the lower portion 13*a* of the slot 13 to vertically align the head 12*a* with the lower and the neck 12*b* with the upper portion of the slot. In the illustrated embodiment, the upper portion 13*b* of the slot extends through an upper surface of the mounting plate 4 and the lower portion 13*a* of the slot extends through a lower surface of the mounting plate 4. In use, with the mounting plate 4 mounted to a top of the door 101, the top edge of the door provides a surface immediately below the lower portion 13*a* of the slot 13. To insert the connection member 12 into the slot 13, the head 12*a* of the connection member may be placed against the top edge of the door, i.e. by lifting the door 101 to contact the head 12. The connection member 12 can then be moved along the top edge surface of the door 101 until the head and neck are received in the lower and upper portions 13*a*, 13*b* of the slot. Thus, the configuration of the mounting plate assists with aligning the connection member with the mounting plate slot in a vertical direction.

The mounting assembly further comprises a securing plate 16. The securing plate is best illustrated in FIGS. 4A and 6A to 6D. The securing plate 16 is provided to the mounting plate 4 to capture the connection member 12 within the slot 13, as shown in FIGS. 2A, 2B, 7A and 7B. The securing plate 16 closes the open end of the slot 13 to capture the connection member 12 within the slot 13. With the securing plate 16 attached to the mounting plate 4 the connection member 12 cannot be removed from the mounting plate 4. The securing plate 16 prevents movement of the connection member 12 along the connection slot 13 in the mounting plate 4. The connection member 12 is captured in a horizontal direction between the securing plate 16 and a closed end of the connection slot 13.

Figure 4A:
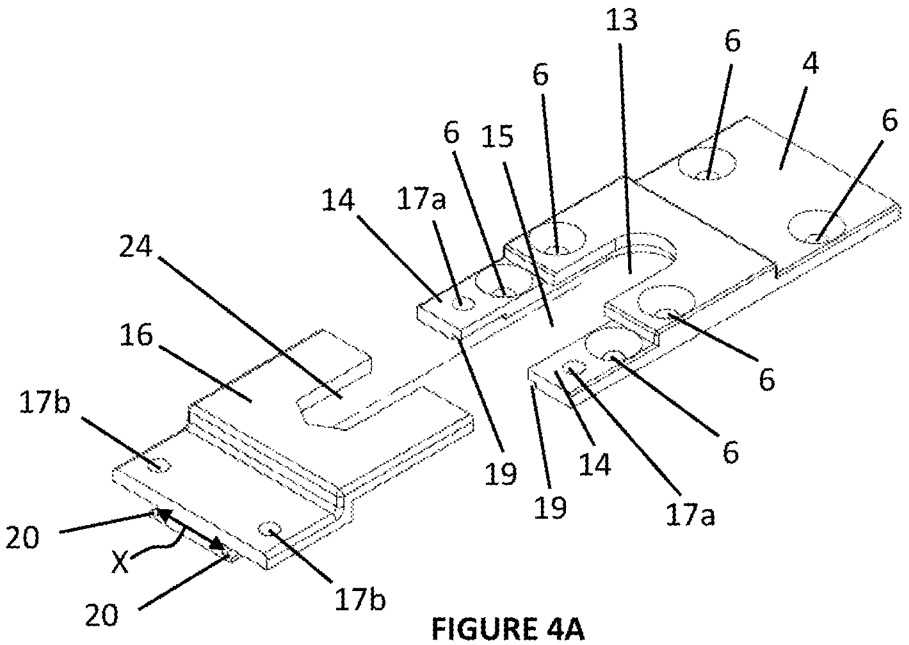
FIG. 4A illustrates a mounting plate and securing plate of the assembly of FIGS. 2A and 2B.
Figure 4B:
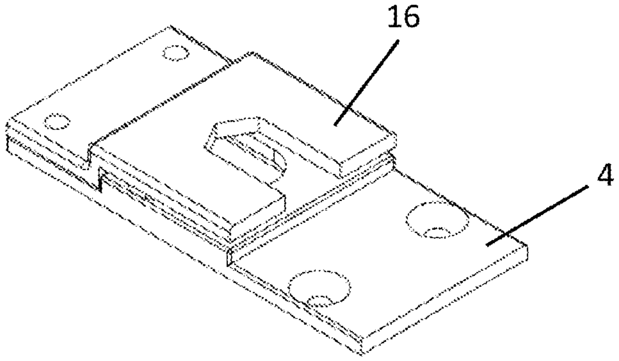
FIG. 4B illustrates the securing plate aligned with the mounting plate for assembly.
Figure 5A:
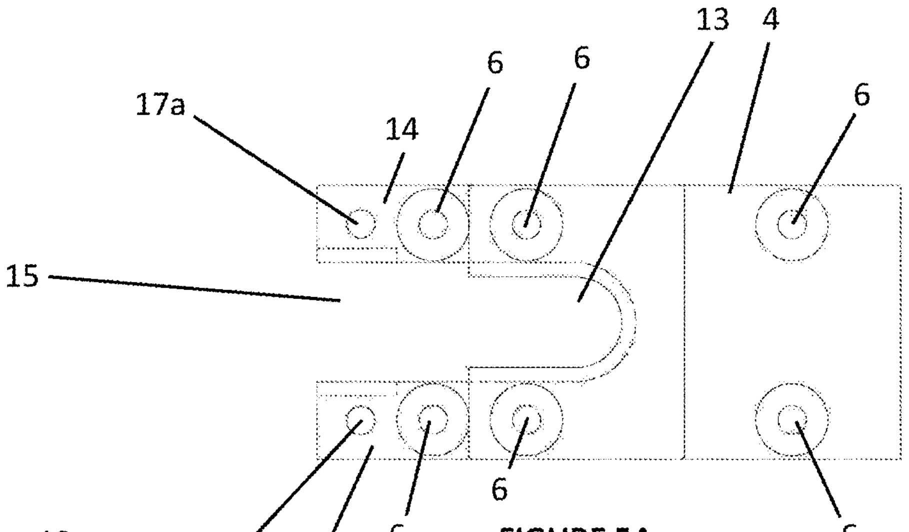
FIGS. 5A to 5D illustrate the mounting plate.
Figure 5B:
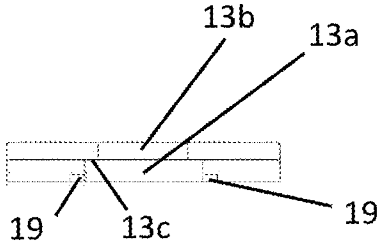
Figure 5C:
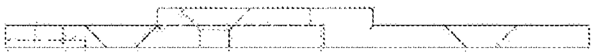
Figure 5D:
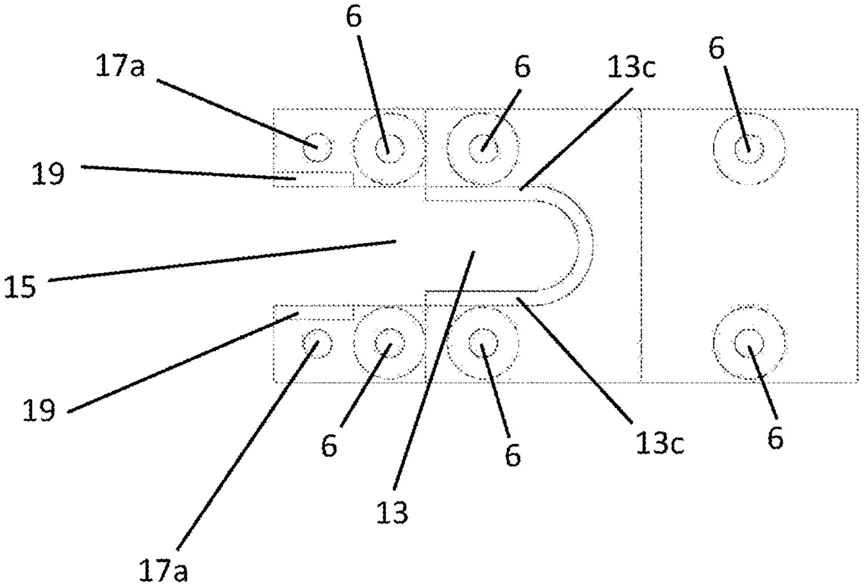
Figure 6A:
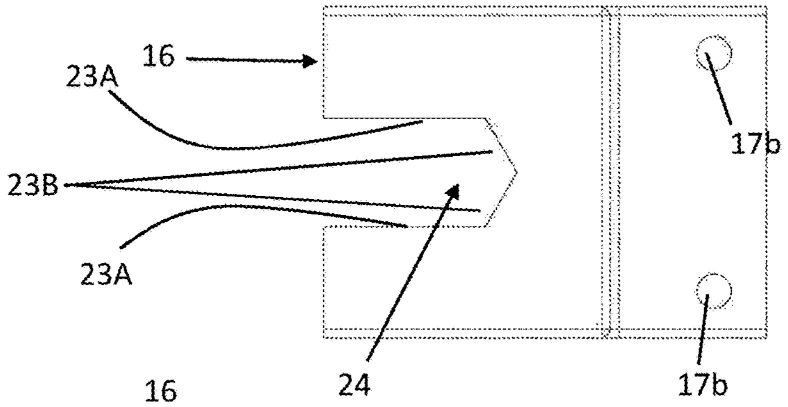
FIGS. 6A to 6D illustrate the securing plate.
Figure 6B:
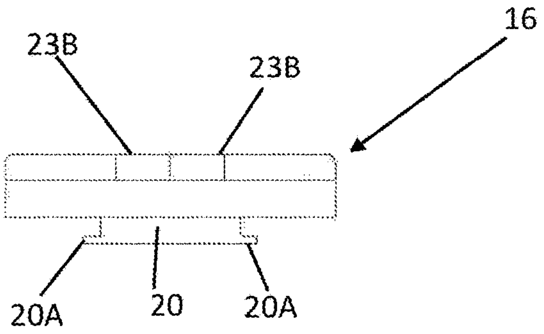
Figure 6C:
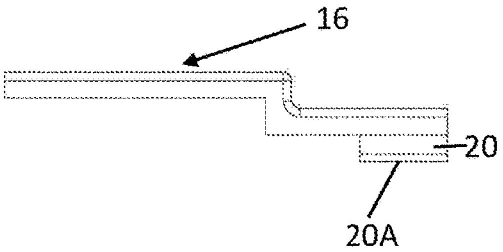
Figure 6D:
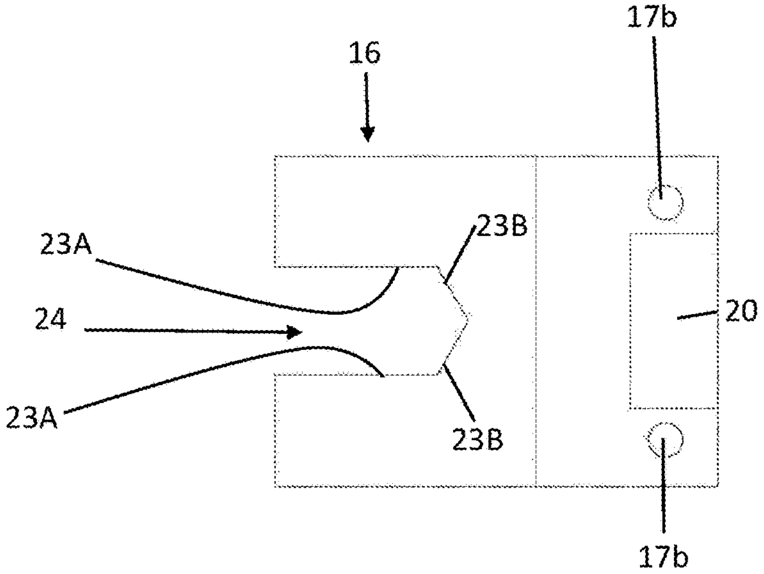

The assembly 1 comprises a locking member 18 in the form of an M4 6 mm screw to lock the securing plate 16 to the mounting plate 4. The illustrated embodiment has an aperture 17*a* in the mounting plate and a corresponding aperture 17*b* in the securing plate 16, refer FIG. 4.

Figure 8:
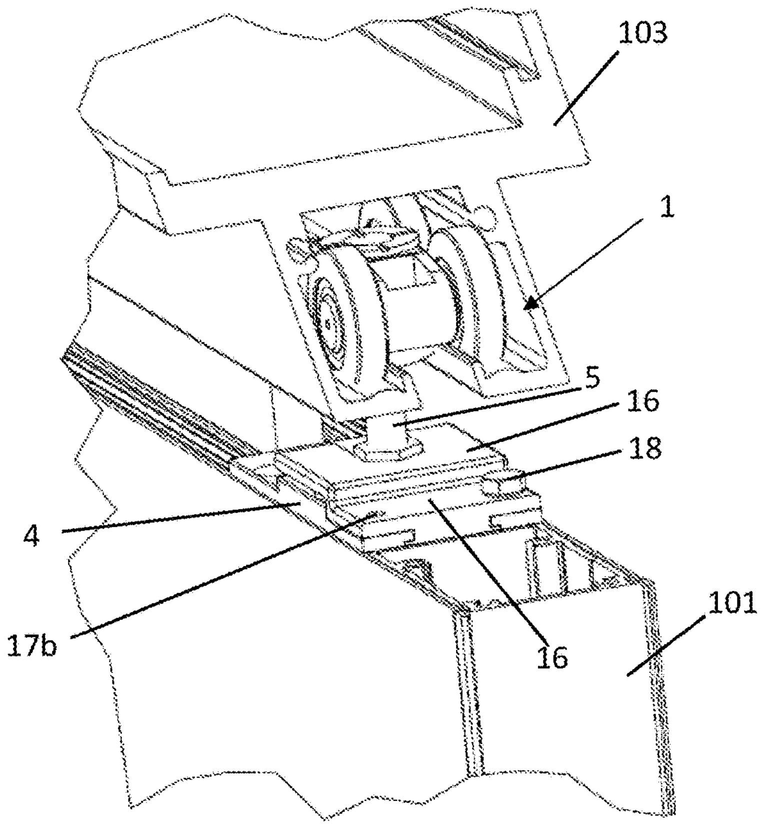
FIG. 8 illustrates a portion of a door mounted by the mounting assembly of FIGS. 2A and 2B to a rail, with a portion of the rail cut away to show wheels of the mounting assembly supported on the rail.

With the securing plate 16 positioned on the mounting plate 4 to capture the connection member 12, the aperture 17*b* of the securing plate 16 is aligned with the aperture 17*a* on the mounting plate 4. As shown in FIG. 8, the locking member 18 is received in the aligned apertures 17*a*, 17*b* to hold the securing plate 16 to the mounting plate 4—(i.e. prevent axial movement of the securing plate 16 relative to the mounting plate to prevent unwanted disconnection). This arrangement facilitates a tool free securement connection between the mounting plate and the securing plate—(i.e. a person can simply use their hands to insert or remove the locking member 18).

The locking member 18 is a pin or rod that is configured to be dropped into the aligned apertures 17*a*, 17*b*. A screw type fastener may be used as the pin or rod, as illustrated in FIG. 8, however the major diameter of the fastener screw thread is less than the inner diameter of the apertures 17*a*, 17*b* so that the fastener may be dropped into the aligned apertures 17*a*, 17*b*. The locking member 18 couples the securing plate 16 to the mounting plate 4 in a horizontal direction (i.e. a direction perpendicular to the longitudinal axis of carriage pin).

The illustrated embodiment has an aperture 17*a*, 17*b* adjacent each longitudinal edge of each of the mounting plate 4 and the securing plate 16 so that there the aperture 17*a*, 17*b* to receive the locking member 18 is accessible from each side of the door 101 for easy access by an installer. A locking member 18 may be provided to one pair of aligned apertures 17*a*, 17*b* only.

The mounting plate 4 comprises a recess 19 to receive a corresponding projection 20 of the securing plate 16, to couple the securing plate 16 to the mounting plate 4 in a vertical direction. With reference to FIGS. 4 to 6D, the illustrated embodiment has a pair of flanged projections 20A, each projection to be received in a corresponding recess 19 in the mounting plate. Each recess 19 is adjacent a side of the entry slot 15 of the mounting plate 4. The recess(es) and projection(s) are configured so that, to attach the securing plate 16 to the mounting plate 4, the securing plate 16 is slid onto the mounting plate 4 in a direction along the slot 13 to receive the projections 20A in the corresponding recesses 19. The projections 20A received in the recesses 19 couple the securing plate 16 to the mounting plate 4 in a horizontal direction (i.e. a direction parallel to the axis of the carriage pin). The recesses are in a bottom surface of the mounting plate 4 so that the projections 20A are captured between the mounting plate 4 and a top of the door. Alternatively, one skilled in the art will understand that the mounting plate 4 may be provided with one or more projections to be received in corresponding recess(es) in the securing plate to couple the securing plate 16 to the mounting plate 4 in a vertical direction.

Additionally, projection 20 on the underside of the securing plate 16 has lateral side wall dimensions (shown by double headed arrow X in FIG. 4A) which allow for push fit with the internal dimensions of entry slot 15 (shown by double headed arrow Y) on the mounting plate 4.

Accordingly, in the illustrated examples the securing plate is configured to engage with an upper surface portion 4U of the mounting plate, and a lower surface of the mounting plate via recesses 19, in use.

The mounting plate and securing plate assembly has a height of, or around, 10.25 mm as shown by double headed arrow Z in FIG. 7A.

With reference to FIGS. 3, 7A and 7B, in the illustrated embodiment, the connection member 12 is attached to the carriage pin 5 by a threaded engagement (21 in FIGS. 7A and 7B). The pin 5 has a male thread and the connection member a corresponding female thread. The threaded engagement 21 between the pin 5 and the connection member 12 provides for height adjustment of the door 101 relative to the rail 103 and therefore a door jamb in which the door is received. Once the door 101 is hung by the mounting assembly, an installer can make a final height adjustment of the door in the door jamb by rotation of the connection member 12 on the pin 5. The connection member 12 has a nut portion 22 in the form of a hex nut having diametrically opposed flats 22A to be engaged by a tool, for example a spanner, to allow an installer to rotate the connection member 12 on the pin 5. To increase the height of the door 101, the connector member 12 may be threaded up the carriage pin 5 such that a bottom end of the carriage pin 5 may extend downwards into a cavity or recess of the door 101, e.g. a space between two side panels or skins of the door. If the door has a solid top plate a drill may be used to make a hole for receiving the carriage pin when the height is adjusted.

The securing plate 16 comprises a feature to engage a complementary feature on the connection member 12 to prevent the connection member 12 from rotation relative to the securing plate 16 and therefore the mounting plate 4. For example, the connection member may comprise a hex nut, or other suitable fastener head which can be rotated in use to adjust the height of the door. Rotation of the carriage and carriage pin 5 relative to the rail 103 about a vertical axis is largely prevented by engagement between the carriage and the rail 103, with the carriage received on the rail 103. Further, the door 101 is largely prevented from rotation relative to the rail 103 about a vertical axis by members (refer members 104 in FIG. 9) secured to the top of the door 101 engaging the rail and/or by there being two or more mounting assemblies 1 spaced apart along the top of the door. Thus, by preventing relative rotation between the connection member 12 and the securing plate and therefore the mounting plate 4, the securing plate 16 prevents relative rotation between the connection member 12 and the carriage pin 5, so that the height of the door within the door jamb does not 'creep' or slowly drop over time. This arrangement prevents or reduces the requirement for the door height to be reset or readjusted after a period of use.

The securing plate 16 presents lateral surfaces 23A and converging surfaces 23B, such as sides and ends of the securing slot 24 to in use engage a diametrically opposed flat surfaces 22A on the nut portion 22 of the connection member 12 to prevent rotation of the connection member 12 relative to the securing plate 16. The lateral surface 23 of the securing plate 16 engages a flat 22 of the hex on the connection member 12. In the illustrated embodiment, the securing plate 16 has a recess or slot 24 herein referred to as a securing slot, which is configured to receive the connection member 12 when the securing plate 16 is attached to the mounting plate 4. Lateral sides 23 of the securing plate slot 24 engage diametrically opposed flats 22 on the connection member 12 to rotationally couple the connection member 12 to the securing plate 16 to prevent relative rotation therebetween. In the illustrated embodiment, a closed end of the securing plate slot 24 is configured to engage two flats 22 on the connection member 12. Thus, in the illustrated embodiment, the securing plate 16 engages four flats on the connection member 12 (as shown in FIGS. 2A and 2B). However, one skilled in the art will appreciate that the securing plate may engage one flat or other feature of the connection member 12 to prevent relative rotation therebetween.

In use, the with the securing plate 16 installed, the connection member 12 is prevented from rotating, and as such the height of the door cannot sag or drop over time. Should a user wish to adjust the height of the door, they can simply remove the securing plate by removing the fasteners in the apertures 17*b*, and slide the securing plate away from the connection member, thereby disengaging the side and/or end walls of the securing slot 24 from the connection member, and allowing rotation of the connection member for adjustment.

It should be appreciated, that with the securing plate removed, the present technology, allows the height of the door to be adjusted, while the door remains connected to the carriage assembly. Accordingly, the securing plate 16 can be removed without affecting the positioning or attachment of the door. In other words, the mounting plate of the present technology is configured to take the full weight of the door, while adjustments are being made.

Components of the present invention including but not limited to the mounting plate 4, securing plate 16, pin 5, and connection member 12 are preferably constructed of a rigid material, such as a metal, or more preferably a steel such as stainless steel. The use of metals may advantageously improve the wear resistance, total loading supported by the door, and/or prevent failure over time, for example due to plastic degradation.

Embodiments of the present invention provide one or more of the following benefits:

- Installation of a sliding door to a rail is simplified and allows for a quick installation by a single person. Disassembly is correspondingly also simplified.
- The connection member on the carriage pin is easily aligned with the slot in a vertical direction by lifting the door to contact the top edge of the door with the connection member.
- The slot is open to an end of the mounting plate so that the connection member can be moved along the top of the door to be received into the open end of the slot.
- Height adjustment of the door relative to the door jamb is simply achieved by rotation of the connection member at the top of the door.
- The carriage pin is easily captured at the mounting plate by the installation of the securing plate. The securing plate is simply slid into place on the mounting plate.
- No tools are required to lock or attach the securing plate to the mounting plate. The securing plate is locked to the mounting plate by simply sliding the securing plate into place on the mounting plate and dropping a pin into the aligned apertures in the securing plate and mounting plate.
- A height adjustment thread is provided between the connection member and the pin, rather than between the pin and the ball of the ball joint at the carriage. This allows for a larger thread to be provided compared to a thread size that can be accommodated at the ball, and therefore provides a more robust connection of the door to the carriage.
- The engagement of the securing plate to the connection member prevents creep or vertical movement of the door over time. Accelerated life cycle testing has proven no change or creep in height setting of the door over 1 million cycles (500 thousand open/close operations). The door mounting arrangement is therefore expected to be largely maintenance free.
- A door mounting system which is suitable for being retrofit to existing doors, with minimum modifications to the door, which can be done in situ.
- A securing plate which attaches to the mounting plate both on an underside, and upper side of the mounting plate. Accordingly, in the event of a failure in the mounting plate, the securing plate can advantageously assist in retaining the connection member within the corresponding slots. For example, any stresses imparted to the securing plate may be transferred both to the door through the fasteners in apertures 6, as well as through the flanged projections 20A, and recesses 19.

Where in the foregoing description reference has been made to integers or components having known equivalents thereof, those integers are herein incorporated as if individually set forth.

The invention claimed is:

1. An assembly for mounting a door to a rail to move between open and closed positions, the assembly comprising:

a carriage;

a mounting plate configured to be mounted to the top of the door;

a securing plate configured to attach to the mounting plate;

a pin extending between the carriage and the mounting plate; and a connection member threadably attached to the pin to adjustably connect the pin to the mounting plate, the connection member comprising a head, a neck and a nut portion;

wherein the mounting plate includes a first open ended slot, the first open ended slot comprising a lower portion and an upper portion, the upper portion dimensioned to receive the neck and the lower portion dimensioned to receive the head, and wherein the head is too wide to be received in or pass through the upper portion so that in use the door hangs from the mounting assembly with the mounting plate bearing on the head of the connection member, and further wherein the securing plate comprises a second open ended slot and wherein, when the securing plate is attached to the mounting plate, the second open ended slot in the securing plate is aligned with the first open ended slot in the mounting plate so as to form a closed slot which receives the connection member, and wherein lateral sides of the second open ended slot of the securing plate engage one or more flat surfaces on the nut portion on the connection member to prevent rotation of the connection member relative to the securing plate.

2. The assembly as claimed in claim 1, wherein a height of the head is commensurate with a height of the lower portion of the slot.

3. The assembly as claimed in claim 1, wherein the mounting plate comprises a pair of tabs at an end of the mounting plate, the tabs spaced apart to present an entry or alignment slot aligned with the lower portion of the slot.

4. The assembly as claimed in claim 3, wherein the entry slot has the same width as the lower portion of the slot.

5. The assembly as claimed in claim 3, wherein the height of the tabs is the same as the height of the lower portion of the slot.

6. The assembly as claimed in claim 1, wherein the assembly comprises a locking member to lock the securing plate to the mounting plate.

7. The assembly as claimed in claim 1, wherein the connection member is attached to the pin by a threaded engagement to provide for height adjustment of the door.

8. The assembly as claimed in claim 1, wherein the carriage comprises a chassis and the assembly comprises a joint between the chassis and the pin to allow the pin to pivot relative to the chassis.

9. The assembly as claimed in claim 8, wherein the joint allows for the pin to pivot or rotate relative to the chassis.

10. The assembly as claimed in claim 9, wherein the joint allows for the pin to pivot or rotate relative to the chassis about a pivot axis perpendicular to a longitudinal axis of the pin and parallel to the rail.

11. The assembly as claimed in claim 8, wherein the chassis comprises a socket, and the pin comprises a ball at an upper end received in the socket to form the joint.

12. The assembly as claimed in claim 11, wherein a pair of diametrically opposed members are provided between the ball and chassis on a central axis of the ball perpendicular to a longitudinal axis of the pin.

13. The assembly as claimed in claim 1, wherein the carriage comprising a chassis and one or more wheels rotationally mounted to the chassis.

* * * * *